United States Patent [19]
Packer et al.

[11] Patent Number: 6,000,018
[45] Date of Patent: Dec. 7, 1999

[54] SYSTEM FOR ALIGNING CONTROL WORDS FOR IDENTIFYING BOUNDARIES OF HEADERLESS DATA SECTORS USING AUTOMATIC INCREMENTING AND DISCARDING OF DATA FRAME NUMBERS

[75] Inventors: John S. Packer, San Jose; Eric C. Erickson, Fremont, both of Calif.

[73] Assignee: Adaptec, Inc., Milpitas, Calif.

[21] Appl. No.: 08/877,115

[22] Filed: Jun. 17, 1997

[51] Int. Cl.$^6$ ........................................ G06F 7/04
[52] U.S. Cl. ........................ 711/154; 711/4; 711/118; 711/133; 714/8; 714/798
[58] Field of Search .................. 360/51, 49, 77.02, 360/77.08; 371/47.1; 395/182.06; 711/154, 118, 133; 369/275.3; 714/8, 798

[56] References Cited

U.S. PATENT DOCUMENTS

| | | | |
|---|---|---|---|
| 5,075,804 | 12/1991 | Deyring | 360/49 |
| 5,255,136 | 10/1993 | Machado et al. | 360/77.02 |
| 5,276,564 | 1/1994 | Hessing et al. | 360/51 |
| 5,386,546 | 1/1995 | Hamaguchi | 395/425 |
| 5,500,848 | 3/1996 | Best et al. | 369/275.3 |
| 5,500,950 | 3/1996 | Becker et al. | 395/445 |
| 5,523,903 | 6/1996 | Hetzler et al. | 360/77.08 |
| 5,544,180 | 8/1996 | Gupta | 371/47.1 |
| 5,802,584 | 9/1998 | Kool et al. | 711/154 |
| 5,812,335 | 9/1998 | Kool et al. | 360/51 |
| 5,812,755 | 9/1998 | Kool et al. | 395/182.06 |

FOREIGN PATENT DOCUMENTS

0 522 750 A2   1/1993   European Pat. Off. .

*Primary Examiner*—Thomas C. Lee
*Assistant Examiner*—Chien Yuan
*Attorney, Agent, or Firm*—Skjerven, Morrill, MacPherson, Franklin & Friel LLP; David T. Millers

[57] ABSTRACT

A disk sequencer, which is loaded with control words from a format table and a frame number associated with the first control word loaded, automatically cycles through loaded control words and finds a control word that corresponds to the current position of a data sector. The disk sequencer includes a first counter that is initialized according to a frame number read from a servo sector or according to an index mark and incremented for each end-of-servo pulse so that the first counter accurately indicates the current position of a data head to a data frame granularity. A second counter is loaded with a data frame number associated with the control words, and the second counter is incremented each time the last control word for a data frame is discarded. For automatic alignment, the disk sequencer cycles through and discards control words until comparison of the counts in the two counters indicates the control words are properly aligned.

13 Claims, 7 Drawing Sheets

SYSTEM FOR ALIGNING CONTROL WORDS FOR IDENTIFYING BOUNDARIES OF HEADERLESS DATA SECTORS USING AUTOMATIC INCREMENTING AND DISCARDING OF DATA FRAME NUMBERS

BACKGROUND

1. Field of the Invention

This invention relates to hard drives and to a disk sequencer selecting control word for identifying the position of a data head relative to a track containing headerless data sectors.

2. Description of Related Art

A conventional magnetic media for a hard drive is a disk having major surfaces divided into concentric tracks for data storage. Servo wedges subdivide the tracks into data frames where the portion of a servo wedge within a track is referred to as a servo sector and separates one data frame in the track from another. A servo sequencer uses the servo sectors in a track to keep a data head following the track. Servo wedges are typically spaced about the disk in a spoke-like pattern, and the time interval between the data head passing consecutive servo wedges depends on the angular velocity of the disk and is independent of the track being followed. Thus, a system clock signal that has the same frequency for all tracks controls timing when handling servo sectors or generating end-of-servo (EOS) pulses marking the ends of servo sectors and the starts of data frames.

For constant density recording in the data frames, the disk area per bit of data is constant, but the rate at which a data head encounters the data varies according to velocity of the track being followed. Accordingly, the data transfer rate depends on the radius of the track, and a byte clock signal having a frequency that depends on the track being followed controls timing of data read or written. The data within the data frames are typically organized into data sectors, each of which contains the same amount of data, for example, 512 bytes. The data sectors may include a single data field that is entirely within a data frame or multiple data fields that are separated from each other, for example, by a servo sector. When reading or writing a data sector, the boundaries of each data field (i.e., the start and splits in each data sector) need to be found. One method for finding data fields uses information from a header of a data sector to locate splits in the data sector. However, split information stored in headers wastes disk space that could otherwise store data.

A headerless data sector format lacks headers containing split information which leaves more disk area for data storage. However, a disk sequencer requires split information from a source other than a header. Such split information can be stored in non-volatile memory or on disk in data sectors and then transferred to a data buffer memory. The split information can be stored more compactly in data sectors than in headers because the split information for one data frame often applies to multiple data frames on multiple tracks. Storing the split information in a data buffer typically requires additional data buffer capacity for the split information, bandwidth for flow of split information, and processing power to select and interpret the split information.

Typically, a microprocessor in the disk drive executes firmware that selects the split information that corresponds to the current position of the data head relative to a track being followed. The calculations required to identify the split information can be complex and consume processing power that could otherwise be used for other purposes such as data buffer management, controlling a servo sequencer, handling a host interface, and converting read/write requests to lists of physical data sector to be accessed. If the burden on the microprocessor for alignment of split information is reduced, a less powerful and less expensive microprocessor might be used. Accordingly, processes and/or circuits that simplify the task of selecting the appropriate split information for a disk sequencer are sought.

SUMMARY

In accordance with the invention, a disk sequencer that uses a table of control words to identify starts and splits of headerless data sectors can be loaded with control words from the table without regard for the current position of data heads relative to a track being accessed. The disk sequencer automatically cycles through the control words discarding control words that do not correspond to the current position of the data heads until the correct control words are found. Since the disk sequencer automatically selects the correct control words, calculational requirements on the microprocessor are less and a less expensive microprocessor can be employed in a hard drive incorporating the disk sequencer.

In accordance with one embodiment of the invention, a microprocessor loads into a disk sequencer the frame number and physical sector number associated with the start of a data frame described by a first control word loaded into the disk sequencer from a table of control words. The disk sequencer compares the frame number for the control word to a frame number corresponding to the current position of a data head. If the frame number for the control word does not correspond to the next data frame to be encountered by the data head, that control word is discarded. When a control word is discarded, the frame and sector numbers for the control words are updated if the discarded control word indicated the next control word corresponds to a different data frame or data sector.

One embodiment of the invention is an alignment process for control words in a disk sequencer in a disk drive using headerless data sectors. The alignment process includes: sequentially loading control words from a format table into the disk sequencer; writing to the disk sequencer a first data frame number that corresponds to the first control word loaded; maintaining a second data frame number that identifies a data frame that is currently aligned with a data head; discarding from the disk sequencer all control words that correspond to the first data frame number; incrementing the first data frame number; and repeating the discarding and incrementing steps until the first data frame number identifies a data frame immediately following the current data frame. Typically, the process further includes writing to the disk sequencer a data sector number that corresponds to the first control word loaded, and incrementing the data sector number when discarding a control word that indicates generation of a sector pulse. The process may be performed during a seek to avoid delaying data transfer.

Another embodiment of the invention is a disk sequencer including: a buffer; a data transfer circuit coupled to the buffer, wherein the data transfer circuit accesses control words from the buffer to identify boundaries of headerless data sectors on a track of a disk; a first counter that counts EOS pulses and provides a first count identifying a data frame that is currently aligned with a data head; a second counter providing a second count; a comparator coupled to the first and second counter, wherein the comparator generates a signal indicating whether the second count identifies a data frame immediately following the current data frame;

and a control circuit that in response to the signal from the comparator indicating the data frame identified by second count does not immediately follow the current data frame, removes from the buffer all control words associated with the frame identified by the second count and then increments the second count.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
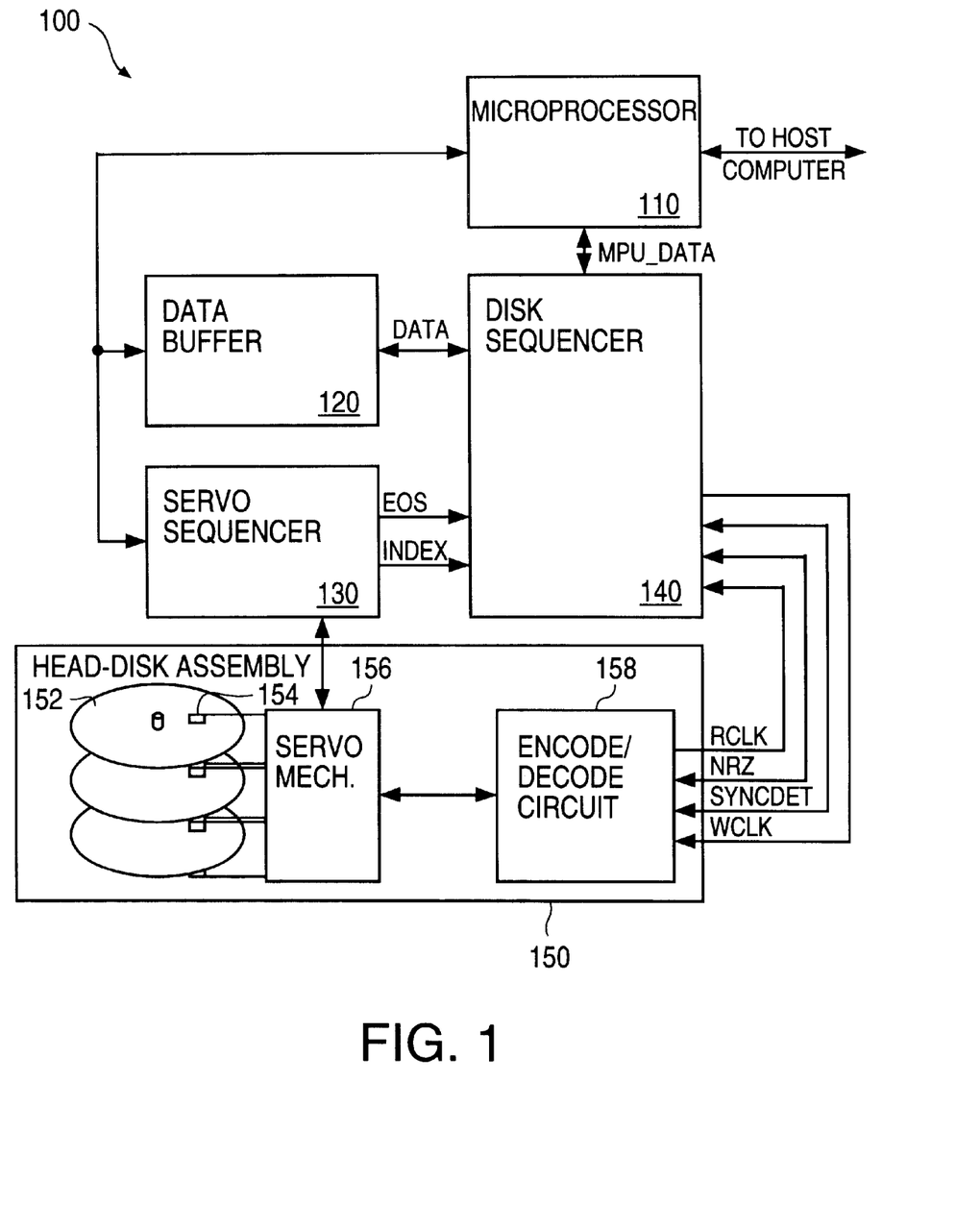
FIG. 1 is a block diagram of a hard drive.

FIG. 1 shows a disk drive system (hard disk) 100 having a headerless architecture. Hard disk 100 includes a microprocessor 110 that executes firmware to control a disk sequencer 140, a servo sequencer 130, and interface operations with a host computer (not shown.) Disk sequencer 140 controls transfer of data between a data buffer 120 and a head-disk assembly (HDA) 150. HDA 150 contains magnetic media (disks) 152 having a headerless data sector format, a servo mechanism 156 that radially positions data heads 154 relative to disks 152, and an encode/decode circuit 158 that converts a data signal NRZ and a write clock signal WCLK from disk sequencer 140 to write signals for data heads 154 and converts signals generated by data heads 154 to data signal NRZ and a read clock RCLK to disk sequencer 140. In embodiment of FIG. 1, encode/decode circuit 158 generates a signal SYNCDET according to data sync fields that data heads 154 encounter on disks 152, and disk sequencer 140 uses signal SYNCDET to synchronize read operations. In an alternative embodiment of the invention, disk sequencer 140 synchronizes data according to patterns in signal NRZ that represent the data sync fields, and signal SYNCDET is not required. A clock signal BYTECLK, which is equal to signal RCLK during a read and signal WCLK during a write, has a frequency that matches the data transfer rate to or from disks 152 and varies with track radius as required for constant density recording. In particular, the frequency of clock signal BYTECLK is higher for tracks with larger radii.

Servo sequencer 130 is coupled to servo mechanism 156 and controls seek operations, track following, and servo sector handling. Servo sectors contain magnetization patterns that servo sequencer 130 uses for track following. The servo sectors also indicate a frame number associated with the servo sector or identify an index point on a track. Commonly, the servo sector associated with the start of the first data frame (frame number 0) is the index for the track, and servo sequencer 130 generates a pulse in a signal INDEX when data heads 154 pass the servo sector associated with the start of the first data frame. Disk sequencer 140 and/or microprocessor 110 for hard drive 100 use a frame number or an index pulse from servo sequencer 130 to initially determine the position of data heads 154 relative to disks 152. Servo sequencer 130 also pulses a signal EOS each time data heads 154 pass any servo sector. Disk sequencer 140 uses the EOS pulses to maintain a count EOSCTR indicating the position of data heads 154 to a data frame granularity.

Some conventional servo sequencers generate sector pulses to mark the beginnings of data sectors. Such servo sequencers generate the sector pulses according to a track-independent system clock signal. In accordance with an aspect of the invention, disk sequencer 140 internally generates sector pulses using a process described below, and disk sequencer 140 does not require externally generated sector pulses to locate data sectors.

Figure 2:
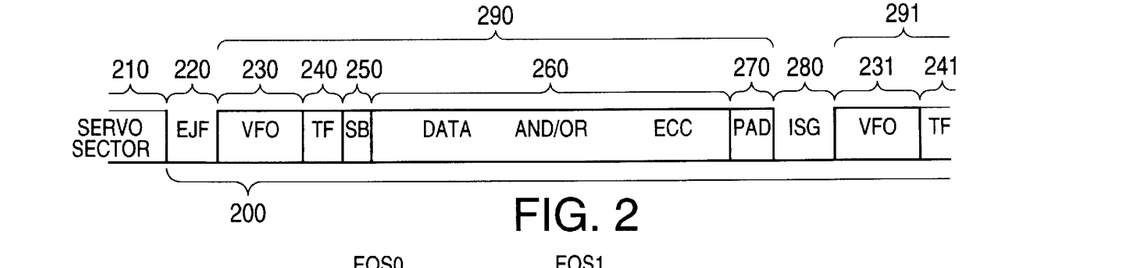
FIG. 2 illustrates the format of a headerless data segment and surrounding fields in a data frame.

Disk sequencer 140 uses the control words stored in data buffer 120 to identify the boundaries of data sectors and frame fields within the data frames in a track. FIG. 2 illustrates an example headerless format for a data frame 200. Following the end of a servo sector 210, data frame 200 includes an EOS jitter field (EJF) 220, a data segment 290, and an inter-sector gap (ISG) 280. EJF field 220 covers disk area that is unusable because of variations in the time required to generate, detect, and act upon EOS pulses. A fixed number of byte clock cycles assigned to EJF field 220 ensures that writing of a data segment does not begin until after the data heads have passed a servo sector. Data segment 290 includes a VFO field 230, a training field 240, a synchronization bit field 250, a data field 260, and a pad field 270. Data field 284 contains storage for data and/or error correction code (ECC) bytes. The size of data field 260 varies depending on whether a data sector includes one or more data segment 290. For example, data field 290 has a maximum size if data segment 290 constitutes a full data sector. If a data sector includes data segment 290 and one or more additional data segments preceding servo sector 210, the data and ECC bytes of the data segment are partitioned among the data segments, and each data segment is less than the maximum size. VFO field 230, training field 240, a data sync field 250, and pad field 270 are referred to herein as overhead fields. A hard drive manufacturer typically fixes the lengths of the overhead fields for all data segments in a track or across the entire drive. Between data segments 290 and 291, ISG 280 provides a margin that prevents overwriting the beginning of data segment 291 on the end of data segment 290.

When one of data heads 154 reads VFO field 230, a phase-locked loop in encode/decode circuit 158 locks the frequency of clock signal BYTECLK to the frequency of a pulse train in signal NRZ caused by bytes in VFO field 230. Data sync field 250 is for byte alignment of data field 260. Typically, bytes in VFO field 230 have value zero, and data sync field 250 contains one or more non-zero bytes. Multiple bytes in data sync field 250 increase fault tolerance. Some sync detection circuits require training field 240 between VFO field 230 and data sync field 250; but in embodiments not having such sync detection circuits, training field 240 can be omitted.

In an exemplary track format, EJF field 220 has a length of 8 byte clock cycles. VFO field 230 is 12 bytes written with a constant value (zero). Training field 282 provides an unambiguous 8-byte pattern that when read and decoded conditions encode/decode circuit 158 for proper acquisition of the analog data from data heads 154, detection of sync field 250, and reading data from data field 260. Sync field 250 is a 3-byte pattern in the exemplary embodiment. Data field 260 has a maximum length of 548 bytes that include 512 data bytes and a 36-byte ECC. Pad field 270 has a length of 10 byte clock cycles, and ISG field 280 has a length of 16 byte clock cycles.

Figure 3:
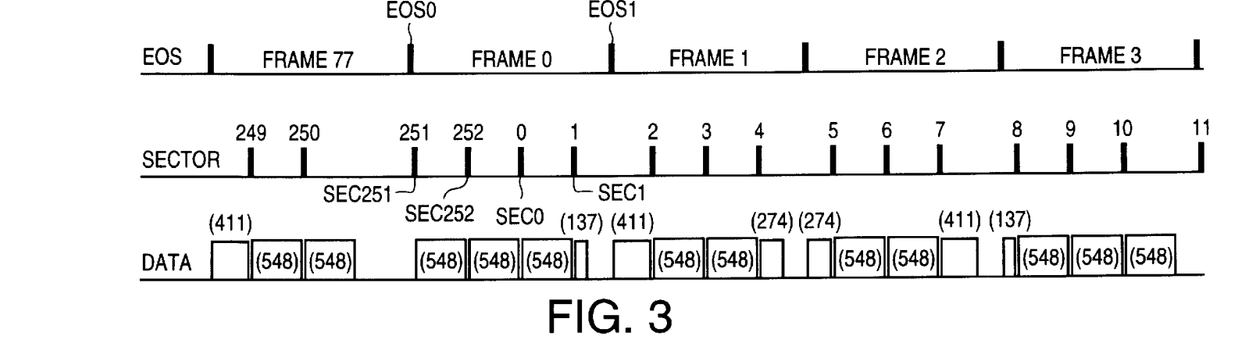
FIGS. 3 and 4 illustrate tracks with multiple data sectors per data frame and multiple data frames per data sector, respectively.
Figure 4:
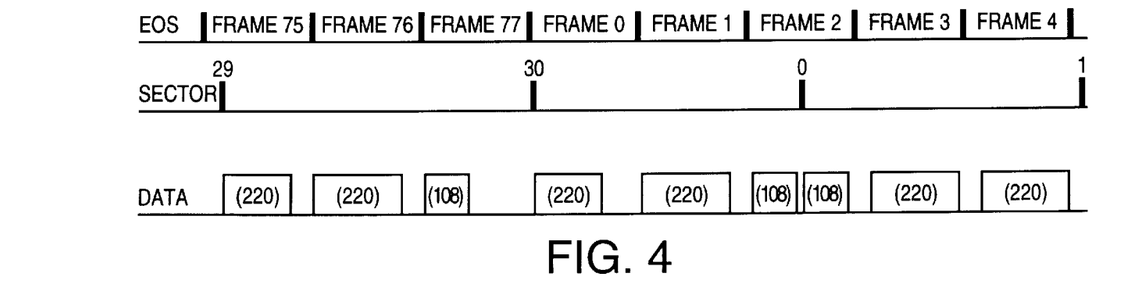

FIG. 3 illustrates the timing of EOS pulses, sector pulses, and data fields for a track format having multiple data sectors per data frame, specifically 78 data frames and 253 data sectors. Each data sector includes either a single data segment or two data segments separated by a servo sector. FIG. 4 illustrates the timing of EOS pulses, sector pulses, and data fields for a track format having multiple data frames per data sector, specifically 78 data frames and 31 data sectors. Different tracks on the same disk could have the two formats illustrated in FIGS. 3 and 4, the format of FIG. 4 being for a track at a smaller radius than the format of FIG. 3. If disks 152 of FIG. 1 have tracks with the formats illustrated in FIGS. 3 and 4, disk sequencer 140 requires one format table containing control words indicating the track format of FIG. 3 and another format table containing control words indicating the track format of FIG. 4.

Table 1 shows a first syntax referred to as the CDR format for control words in format tables.

TABLE 1

CDR Format Control Word Syntax

| Bits | Label | Definition |
|---|---|---|
| 15 | PARITY | PARITY is set or cleared so that the control word has even parity. |
| 14 | SKIP | SKIP enables or disables data transfer for control word. |
| 13 | LAST | LAST indicates whether the control word is the last control word for a data sector. |
| 12:0 | EVENTC | EVENTC indicates a number of byte clock cycles associated with the control word. |

In accordance with the CDR format, each control word indicates: an event-count (or number) of byte clock cycles until an event within a data frame; whether a data sector associated with the control word should be skipped (i.e. not read or written); and whether the control word is the last for a data sector.

In accordance with an aspect of the invention, Table 2 shows a control word format referred to herein as ECW (event control word) format. In accordance with the ECW format, each control word indicates: an event-count (or number) of byte clock cycles between and initial and terminal events within a data frame; whether a data sector associated with the control word should be skipped; whether the beginning of the event-count should be synchronized with an EOS pulse, a sector pulse, or data synchronization pulse; and whether a sector pulse or a data transfer interrupt should be generated following the end of the event-count.

TABLE 2

ECW Format

| Bits | Label | Definition |
|---|---|---|
| 15 | PARITY | Set or cleared so that the control word has even parity. |
| 14 | SKIP | SKIP is 0 or 1 to respectively enable or disable data transfer during an event-count. |

TABLE 2-continued

ECW Format

| Bits | Label | Definition |
|---|---|---|
| 13 | SEOS | When GSEC = 1 and SEOS = 1, the event-count is synchronized with an EOS pulse. When GSEC = 1 and SEOS = 0, the event-count is synchronized with a sector pulse. When GSEC = 0 and SEOS = 0, the event-count is synchronized with a data sync signal. When GSEC = 0 and SEOS = 1, the control word is ignored. |
| 12 | GSEC | When GSEC = 1, a sector pulse is generated at the end of the event-count. When GSEC = 0 and SEOS = 0, an interrupt is generated at the end of the event-count. |
| 11:0 | EVENTC | The event-count indicating the number of byte clock cycles before an event (e.g. a sector pulse or an interrupt signal). |

Bits SEOS and GSEC form an encoded field having four encoding: synchronize to an EOS pulse and generate a sector pulse at the end of count EVENTC; synchronize to a previous sector pulse and generate another sector pulse at the end of count EVENTC; synchronize to a data synchronization pulse and interrupt data transfer at the end of count EVENTC; and ignore this control word.

The sector pulses start processing of a data segment and possibly start the next event-count. An interrupt stops data transfer while servo sequencer 130 handles a servo sector.

Table 3 shows an embodiment of a track format table using control words of Table 2 to indicate the track format illustrated in FIG. 3.

TABLE 3

Format Table for Multiple Sectors per Frame

| PARITY | SKIP | SEOS | GSEC | EVENTC | COMMENT |
|---|---|---|---|---|---|
| 1 | 0 | 1 | 1 | 008h | EOS0 -> SEC251 |
| 0 | 0 | 0 | 1 | 255h | SEC251 -> SEC252 |
| 0 | 0 | 0 | 1 | 255h | SEC252 -> SEC0 |
| 0 | 0 | 0 | 1 | 255h | SEC0 -> SEC1 |
| 1 | 0 | 0 | 0 | 089h | DSYNC1 -> SPLIT |
| 1 | 0 | 1 | 1 | 1D4h | EOS1 -> SEC2 |
| 0 | 0 | 0 | 1 | 255h | SEC2 -> SEC3 |
| 0 | 0 | 0 | 1 | 255h | SEC3 -> SEC4 |
| 1 | 0 | 0 | 0 | 112h | DSYNC4 -> SPLIT |
| 1 | 0 | 1 | 1 | 146h | EOS2 -> SEC5 |
| 0 | 0 | 0 | 1 | 255h | SEC5 -> SEC6 |
| 0 | 0 | 0 | 1 | 255h | SEC6 -> SEC7 |
| 1 | 0 | 0 | 0 | 196h | DSYNC7 -> SPIT |
| 1 | 0 | 1 | 1 | 0C2h | EOS3 -> SEC8 |
| 0 | 0 | 0 | 1 | 255h | SEC8 -> SEC9 |
| 0 | 0 | 0 | 1 | 255h | SEC9 -> SEC10 |

Table 3 indicates the control words for the first four data frames FRAME 0 to FRAME 3 of the track illustrated in FIG. 3. Repeatedly looping through Table 3 provides control words for frames FRAME 4 to FRAME 77.

Table 4 shows a format table using the control words of Table 2 for the track format illustrated in FIG. 4.

TABLE 4

Format Table for Multiple Frame per Sector

| PARITY | SKIP | SEOS | GSEC | EVENTC | COMMENT |
|---|---|---|---|---|---|
| 1 | 0 | 1 | 1 | 008h | EOS0 -> SEC30 |
| 1 | 0 | 0 | 0 | 0DCh | DSYNC30a -> SPLIT |
| 1 | 0 | 0 | 0 | 0DCh | DSYNC30b -> SPLIT |
| 1 | 0 | 1 | 1 | 096h | EOS2 -> SEC0 |
| 1 | 0 | 0 | 0 | 0DCh | DSYNC0a -> SPLIT |
| 1 | 0 | 0 | 0 | 0DCh | DSYNC0b -> SPLIT |
| . | . | . | . | . | Repeat the above |
| . | . | . | . | . | 14 times for data |
| . | . | . | . | . | sectors 2 to 28 |
| 1 | 0 | 1 | 1 | 008h | EOS75 -> SEC29 |
| 1 | 0 | 0 | 0 | 0DCh | DSYNC29a -> SPLIT |
| 1 | 0 | 0 | 0 | 0DCh | DSYNC29b -> SPLIT |

As an alternative to Table 4, which contains 93 control words, just the first six control would be sufficient if disk sequencer 140 treats the last data sector 29 differently. In particular, looping through the first six control words 15 times provides the control words for data sectors 0 to 28. Only the first three control words of a sixteenth loop are actually usable. If the sixteenth loop wraps to the top of the table after the third control word, disk sequencer 140 only processes the correct control words. Alternatively, after handling the last data sector, disk sequencer 140 can discard all previously loaded control words and reset loading of control words to the top of the format table.

Tables 3 and 4 may be stored as lists in non-volatile memory, for example, in ROM, EEPROM, EPROM, or Flash memory (not shown) or on disks 152, for example, in a track having a track format table stored in non-volatile memory so that the tables can be read from the track and into data buffer 120. Less disk space is required to store track format tables than would be required for headers because a single track format table typically applies multiple disks 152 and multiple tracks in an annular zone on each disk. Further, one control word in a track format table such as Table 3 can apply to multiple data sector on each track. However, to store format tables on disk, some other source must provide the format information for reading the track containing the format tables.

Disk sequencer 140 uses the format tables to locate boundaries of data sectors, defect information to identify which data sectors are defective or should otherwise be skipped, and request information indicating which data sectors are actually requested for a transfer. Microprocessor 110 prepares this information for disk sequencer 140. In one embodiment of the invention, microprocessor 110 modifies control words from format tables by setting bit SKIP if necessary, to indicate a defective data sector or data sectors to be skipped for other reasons. In this embodiment, microprocessor 110 must duplicate control words from tables such as Table 3 so that each control word corresponds to one specific data sector because skip bits typically differ even for data sectors otherwise having the same format. This can greatly increase the number of control words required per track. Alternatively, disk sequencer 140 uses a repeat count and shortened format table such as Table 3, and microprocessor 110 separately provides a list of the physical sector numbers of defective data sectors.

There are several alternative methods for loading control words into disk sequencer 140. In a first alternative, microprocessor 110 loads the control words into disk sequencer 140 for a data transfer. Loading of control words may be periodic, for example, one set loaded per data frame or per data sector. For a second alternative, microprocessor 110 passes an address of a track format table in data buffer 120 to disk sequencer 140. Disk sequencer 140 then retrieves control words from the table starting at the indicated address. Microprocessor 110 can also pass the addresses of the top and bottom of the table (or equivalent information) to disk sequencer 140 for wrap around from the bottom to the top of the table.

Control words from a format table must be synchronized or aligned with the position of data heads 154 relative to disks 152. In particular, when data heads are over a data frame, disk sequencer 140 requires the control words associated with that data frame. Microprocessor 110 or alternatively disk sequencer 140 aligns the control words. When microprocessor 110 is responsible for alignment, firmware determines the frame and sector numbers corresponding to the current position of the data heads and then selects the control word corresponding to those frame and sector numbers. For a format table such as Table 3 or 4, the number of control words per track, frame, or sector varies in a complex manner. Accordingly, selection of the correct control word for alignment can be complex and typically requires sequentially parsing through the table until the control word corresponding to the current data sector is found. This requires a significant amount of processing power.

In accordance with an aspect of the invention, control words that are no-ops or fillers are added to track tables so that the number of control word per data sector is constant. Table 5 indicates an alternative format table for the track of FIG. 3.

TABLE 5

Track Format Table

| PARITY | SKIP | SEOS | GSEC | EVENTC | COMMENT |
|---|---|---|---|---|---|
| 1 | 0 | 1 | 1 | 008h | EOS0 -> SEC251 |
| 1 | 0 | 1 | 0 | 000h | Filler |
| 0 | 0 | 0 | 1 | 255h | SEC251 -> SEC252 |
| 1 | 0 | 1 | 0 | 000h | Filler |
| 0 | 0 | 0 | 1 | 255h | SEC252 -> SEC0 |
| 1 | 0 | 1 | 0 | 000h | Filler |
| 0 | 0 | 0 | 1 | 255h | SEC0 -> SEC1 |
| 1 | 0 | 0 | 0 | 089h | DSYNC1 -> SPLIT |
| 1 | 0 | 1 | 1 | 1D4h | EOS1 -> SEC2 |
| 1 | 0 | 1 | 0 | 000h | Filler |
| 0 | 0 | 0 | 1 | 255h | SEC2 -> SEC3 |
| 1 | 0 | 1 | 0 | 000h | Filler |
| 0 | 0 | 0 | 1 | 255h | SEC3 -> SEC4 |
| 1 | 0 | 0 | 0 | 112h | DSYNC4 -> SPLIT |
| 1 | 0 | 1 | 1 | 146h | EOS2 -> SEC5 |
| 1 | 0 | 1 | 0 | 000h | Filler |
| 0 | 0 | 0 | 1 | 255h | SEC5 -> SEC6 |
| 1 | 0 | 1 | 0 | 000h | Filler |
| 0 | 0 | 0 | 1 | 255h | SEC6 -> SEC7 |
| 1 | 0 | 0 | 0 | 196h | DSTBC7 -> SPIT |
| 1 | 0 | 1 | 1 | 0C2h | EOS3 -> SEC8 |
| 1 | 0 | 1 | 0 | 000h | Filler |
| 0 | 0 | 0 | 1 | 255h | SEC8 -> SEC9 |
| 1 | 0 | 1 | 0 | 000h | Filler |
| 0 | 0 | 0 | 1 | 255h | SEC9 -> SEC10 |
| 1 | 0 | 1 | 0 | 000h | Filler |

Table 5 has a fixed number (two) of control words per data sector. Fillers are added, if necessary, following the last control word for data sector so that the total number of control words per data sector is constant. The address of the control word corresponding to a data sector can be determined by adding an offset to the product of the physical sector number for the data sector and the number of control words per data sector. Microprocessor 110 requires very little processing power for such alignment calculations.

However, Table 5 is longer than Table 3 and requires more space in data buffer 120 and more bandwidth for transfer of control words.

When disk sequencer 140 aligns control words, microprocessor 110 starts disk sequencer 140 at any convenient location (typically the start) of a format table such as Table 3 and disk sequencer 140 automatically selects control words aligned with the position of data heads 154. This has the advantage of reducing the processing power requirements on microprocessor 110 without increasing the length of format tables.

Figure 5:
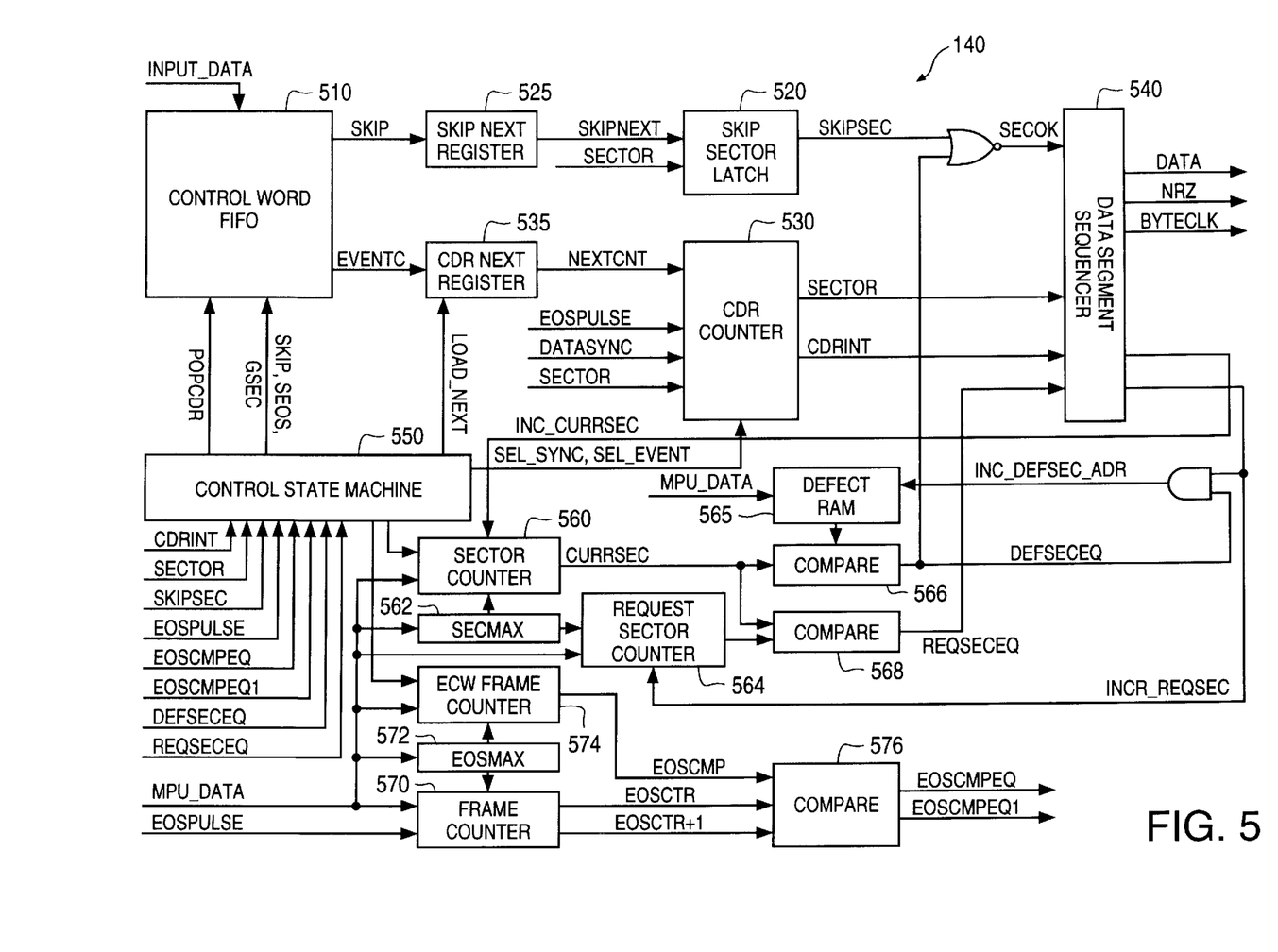
FIG. 5 is a block diagram of a portion of a disk sequencer in accordance with an embodiment of the invention.

FIG. 5 shows a block diagram of an embodiment of disk sequencer 140 in accordance with an embodiment of the invention. Disk sequencer 140 includes a FIFO buffer 510 into which microprocessor 110 or a FIFO filler (not shown) loads control words. In the exemplary embodiment, the control word are 16-bit values in compliance with syntax indicated in Table 1 or 2, and FIFO buffer 510 is a 4×16-bit FIFO buffer. FIFO buffer 510 has output signals SKIP, SEOS, GSEC, and EVENTC which indicate values of fields of the same names in a first-loaded (top) control word in FIFO buffer 510. A state machine 550 uses signals SKIP, SEOS, GSEC, and EVENTC from control word FIFO 510 to control generation of sector pulses and interrupt signals for a data segment sequencer 540.

If a control word is necessary for generation of a sector pulse or an interrupt, signal EVENTC, which represents an event-count from the control word, is stored in register 535 for transfer to a counter 530. The control word is discarded, for example, if the control word is a filler or otherwise not currently necessary. For each control word used, state machine 550 selects an initial event such as an EOS pulse, a sector pulse, or a data sync pulse to start counter 530 decrementing the associated event-count and selects whether counter 530 generates a sector pulse in signal SECTOR or an interrupt in signal CDRINT when the event-count decrements to zero. As described below, the sector pulses and interrupts start and stop data segment sequencer 540 which transfers data between disks 152 and data buffer 120.

Figure 6:
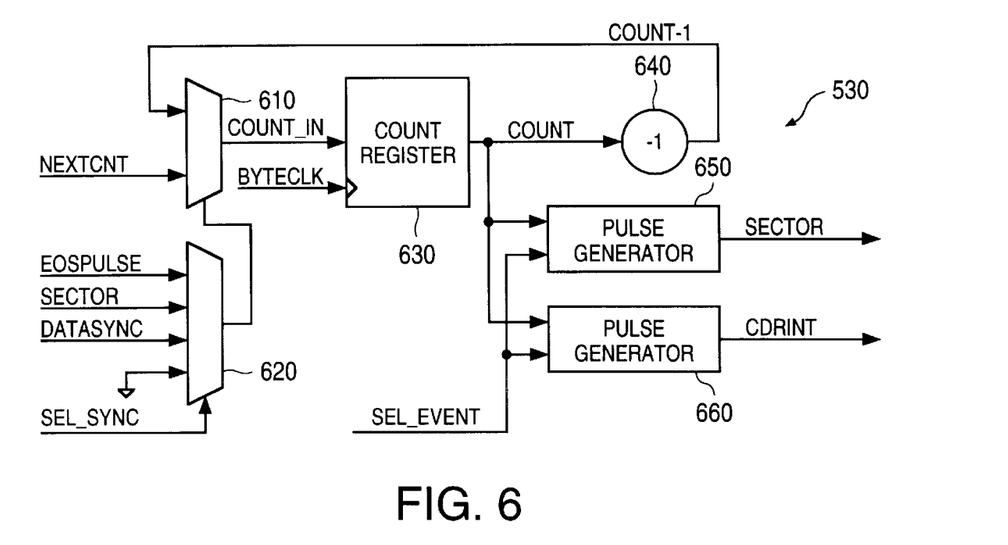
FIG. 6 is a block diagram of a counter that generates sector pulses and interrupt signals in the embodiment of FIG. 5.

FIG. 6 shows an embodiment of counter 530 that is a free running counter. Counter 530 includes a register 630 for storing the count value COUNT, a decrementing circuit 640 which subtracts 1 from the count value, and a multiplexer 610 which controls whether the decremented count value COUNT−1 or the value of a signal NEXTCNT is the input signal to register 630. When a synchronization signal from a multiplexer 620 is asserted, the value of signal NEXTCNT is loaded into register 630, and counter 530 begins decrementing a new event-count. A signal SEL_SYNC from state machine 550 controls which of signals EOSPULSE, SECTOR, or DATASYNC synchronizes loading a new event-count. Signal EOSPULSE includes EOS pulses that have been synchronized with the byte clock. Signal SECTOR is the output signal from pulse generator 650. Signal DATASYNC contains data sync pulses that are synchronized with the byte clock. When the synchronization signal is not asserted, multiplexer 610 selects signal COUNT−1 and the count is decremented. When the count reaches zero, a pulse generator 650 or 660 asserts a one-clock cycle sector pulse in signal SECTOR or asserts an interrupt via signal CDRINT. A signal SEL_EVENT from state machine 550 selects which of signals SECTOR or CDRINT is asserted.

The sector pulses and interrupts must match the position of data heads 154 relative to disks 152 for data segment sequencer 540 to access desired data sectors on disks 152. Accordingly, control words must be aligned to the position of data heads 154. In accordance with an aspect of the invention, disk sequencer 140 performs automatic alignment to reduce the processing power requirements on microprocessor 110. For automatic alignment, disk sequencer 140 includes counters 560, 570, and 574 for counts CURRSEC, EOSCTR, and EOSCMP, respectively. Count EOSCTR indicates the current position of data heads 154 to a data frame granularity. Counts EOSCMP and CURRSEC indicate the data frame and the data sector associated with the top control word in FIFO buffer 510. A data signal MPU_DATA from microprocessor 110 initializes counters 560, 570, and 574. A comparator 576 compares counts EOSCTR and EOSCMP to determine whether the control words are properly aligned.

Frame counter 570 may be initialized with a frame number during start-up of hard drive 100 and is updated for each EOS pulse. For example, during start-up, an index pulse from servo sequencer 130 resets counter 570 to the frame number (typically zero) of the data frame following the index pulse. Alternatively, servo sequencer 130 reads a servo wedge number that microprocessor 110 writes to counter 570. Counter 570 increments count EOSCTR for each EOS pulse from servo sequencer 130 and automatic wraps count EOSCTR to the first data frame number (zero) in response to count EOSCTR exceeding a maximum data frame number EOSMAX. Servo sequencer 130 preferably provides EOS pulses even during a seek so that count EOSCTR remains an accurate position indicator and does not need to be changed after a seek.

During a seek to a track, microprocessor 110, without performing any alignment checking, prepares or selects a format table and passes the starting address and a repeat count for the format table to disk sequencer 140. Microprocessor 110 also writes to counters 560 and 574 the sector and data frame numbers associated with the first control word in the format table and writes to a register 572 the maximum data frame number EOSMAX to control wrap-around functions of counters 570 and 574. A maximum sector number SECMAX is stored in a register 562 and controls wrap-around functions of counter 560. For the track of FIG. 3, for example, microprocessor 110 sets count EOSCMP in counter 574 to zero, count CURRSEC in counter 560 to 250, maximum sector number SECMAX in register 562 to 252, and maximum data frame number EOSMAX in register 572 to 77.

Control words are loaded into FIFO buffer 510 beginning at the start of the format table, and state machine 550 removes control words from FIFO buffer 510 as the control words are processed or discarded. Sequential loading of control words from the format table into FIFO buffer 510 loops from the bottom to the top of the table as required to keep filling FIFO buffer 510 as control words as processed. The control words in FIFO buffer 510 and counts EOSCMP and CURRSEC initially have no set relation to the current data head position as indicated by count EOSCTR. Comparator 576 compares count EOSCTR from counter 570 to count EOSCMP and generates a signal EOSCMPEQ1 indicating whether count EOSCMP is equal to EOSCTR+1. If so, the top control word in FIFO buffer 510 corresponds to the start of the next data frame and counts EOSCMP and CURRSEC correctly indicate the data frame number and physical sector number at the start of the next data frame. The event-count from FIFO buffer 510 is loaded into register 535 to await the next EOS pulse marking the start of the next data frame.

If count EOSCMP is not equal to count EOSCTR+1, state machine 550, based on fields SEOS and GSEC, determines whether to increment count EOSCMP or CURRSEC or neither before popping a control word from FIFO buffer 510. Count CURRSEC is incremented if the top control word indicates generation of a sector pulse at the end of the event-count. Count EOSCMP is incremented if the top control word indicates generation of an interrupt or generation of a sector pulse after a count synchronized with an EOS pulse. Comparator 576 compares the new value of count EOSCMP to count EOSCTR, while another control word becomes the top control word in FIFO buffer 510 and signals SKIP, SEOS, GSEC, and EVENTC change according to the new top control word. State machine 550 sequentially removes control words from FIFO buffer 510 in above fashion until count EOSCMP is equal to EOSCTR+1 indicating that the control words in FIFO buffer 510 are aligned for the next EOS pulse.

Once the control words are properly aligned, event-counts from the control word are processed through counter 530. Counter 530 generates the sector pulses and interrupts necessary for starting data segment sequencer 540 at the beginning of a data sector and halting data segment sequencer 540 at a split caused by a servo sector. The example of processing the control words of Table 3 starting at an EOS pulses EOS0 is now described. For this example, control words are processed starting from the first control word in Table 3.

Before servo sequencer 130 generates EOS pulse EOS0, a first event-count (8) from the first control word in Table 3 is loaded into register 535 and state machine 550 selects signal EOSPULSE for synchronization of the first event-count. The skip field value is loaded into a register 525. At EOS pulse EOS0, the first event-count transfers from register 535 to counter 530. Counter 530 decrements the first event-count while an EJF field passes data heads 154. While decrementing the event-count for the top control word, the top control word is removed from FIFO buffer 510, and another control word becomes the new top control word in FIFO buffer 510. State machine 550 maintains signal SEL_EVENT for the removed control word while beginning to process the next control word. For the example of Table 3, state machine 550 loads a skip value from the second control word of Table 3 into register 525, loads an event-count 597 (255h) from the second control word into register 535, and selects signal SECTOR as the triggering event for the new event-count because fields SEOS and GSEC of the second control word indicate that the second event-count is synchronized with a sector pulse.

Eight byte clock cycles after EOS pulse EOS0, when the first event-count decrements to zero, counter 530 generates a sector pulse SEC251 and begins decrementing the second event-count. The sector pulse starts data segment sequencer 540 and causes the value of the skip field from register to be loaded into a latch 520. Data segment sequencer starts data transfer for a data segment if the current sector is requested, is not defective, and control words for the current sector do not indicate the data sector should be skipped. To identify that a sector is requested for a transfer, disk sequencer 140 includes a counter 564 into which microprocessor 110 writes information indicating a range of requested data sectors. Counter 564 generates a signal indicating the physical sector number of the next data sector to be transferred. Counter 564 may be a counter that increments a sector number from the start to the end of a request range, or any other circuit which provides a signal identifying requested data sectors. A comparator 568 compares the sector number from counter 564 to signal CURRSEC from counter 560. If signal CURRSEC matches the sector number from counter 564, comparator 568 asserts a signal REQSECEQ to indicate the current sector is requested for a transfer.

Microprocessor 110 stores in a defect RAM 565 an ordered list of the physical sector numbers of defective data sectors in the current track. The list is matched with the requested sectors and begins with the physical sector number of the first defective sector following the first requested data sector. A comparator 566 compares a sector number from defect RAM 565 to the current sector number indicated by signal CURRSEC and asserts a signal DEFSECEQ if there is a match indicating the current sector is defective. Signal DEFSECEQ being asserted disables data transfer even if the current data sector is a requested data sector.

Data transfer is also disabled if a signal SKIPSEC is asserted because control words for the current data sector indicate that the data sector should be skipped. Sector pulses trigger latch 520 so that latch 520 only loads a skip field value SKIPNEXT from register 525 once for a data sector. Accordingly, signal SKIPSEC is only effected by field SKIP of one control word per data sector. At sector pulse SEC251, signal SKIPSEC is set to indicate the value of the skip field from the second control word of Table 3.

Since the second control word of Table 3 indicates synchronization with a sector pulse, sector pulse SEC251 causes counter 530 to load and immediately begin decrementing the second event-count. When the event-count transfers to counter 530, state machine 550 selects the output signal for the second skip count and removes the second control word from FIFO buffer 510, and the event-count and skip field for the third control word are stored in registers 535 and 525.

Figure 7:
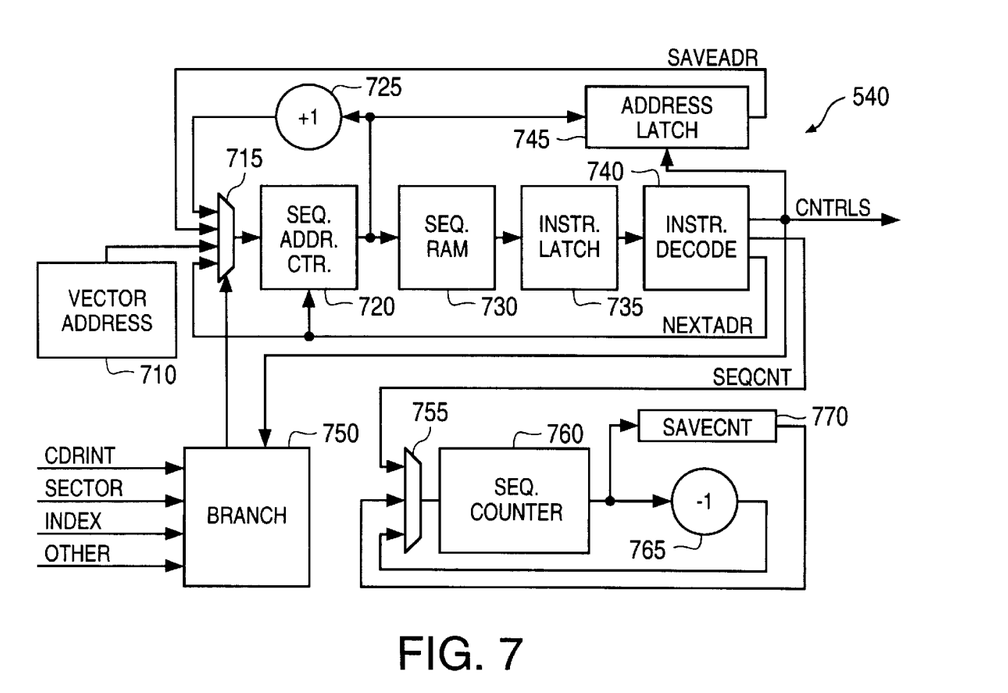
FIG. 7 is a block diagram of a data segment sequencer for the embodiment of FIG. 5.

Data segment sequencer 540 controls data transfers and uses signals SECTOR and CDRINT to identify boundaries of data segments. FIG. 7 illustrates an exemplary embodiment of data segment sequencer 540 in which a random access memory (RAM) 730 holds a sequencer program. Microprocessor 110 loads RAM 730 with a sequencer program that implements a read vector and a write data vector for transferring data segments and an interrupt subroutine. The read and write vectors are adapted to the particular data segment format and use byte counts to identify boundaries of fields within a data sector. In an exemplary embodiment of the invention, configuration registers in disk sequencer 140 store byte counts for the various overhead fields, the largest data field, and frame fields such as EJF field 220 and ISG field 280 in FIG. 2.

For execution of the sequencer program, data segment sequencer 540 includes an address counter 720 that holds an instruction address for RAM 730 and an instruction latch 735 to hold the instruction read from that address. An instruction decoder 740 executes the instruction held by latch 735. A multiplexer 715, which is coupled to an adder 725, an address latch 745, a vector address register 710, and instruction decoder 740, selects the address of the next instruction to be executed. Adder 725 increments the instruction address in counter 720 for sequential execution of the sequencer program. Address latch 740 holds a saved address, for example, a return address, that instruction decoder 740 selects when executing a return or return from interrupt instruction. Instruction decoder 740 calculates the next address for branch or call instructions. Register 710 holds addresses subroutines such as the read vector, the write vector, and the interrupt procedures. A branch select circuit 750 is triggered by signals CDRINT and SECTOR and selects the appropriate routine to be executed in response to those signals.

In executing the sequencer program, instruction decoder 740 selects byte counts that are loaded into a counter 760 and generates signals CNTRLS that control circuitry (not shown) for processing segment fields. Each cycle of the byte clock, the count in counter 760 changes in one of three ways depending on the signal that a multiplexer 755 selects. The count in counter 760 can be set to a sequence count SEQCNT from instruction decoder 740, decremented by an adder 765, or set to a count previously saved in a register 770.

In response to a sector pulse, instruction decoder 740 loads counter 760 with the counts for the first leading overhead field such as VFO field 230, and counter 760 decrements that byte count each cycle of the byte clock until the count is decremented to zero signaling the end of the first overhead. During the count for the first overhead field, instruction decoder 740 performs control operations that depend on whether the data transfer is enabled for the data sector and whether the transfer is a read or a write. Once the count for the first overhead field is complete, instruction decoder 740 loads counter 760 with the next byte count, for example, for training field 240 or data sync field 250 if no training field is used. Decrementing the counts for the overhead fields controls timing of processing of overhead fields.

After a data sync field, counter 760 is loaded with the data count for a full data sector if the current data segment is the first data segment in a data sector. A sector pulse marks the start (i.e. the first data segment) of a data sector. Decrementing of the data count controls the timing of data transfer and may be synchronized with a data sync signal generated by HDA 150 or disk sequencer 140 during processing of the overhead fields. Unless an interrupt is asserted through signal CDRINT, the data count decrements to zero before counts for trailing overhead fields such as pad field 270 start. Counter 530 asserting an interrupt signal CDRINT causes the data count from counter 760 to be saved in latch 770, halts data transfer, and starts an interrupt routine in data segment sequencer 540.

The interrupt routine handles the trailing overhead fields, waits for an EOS pulse, and processes initial fields in the next data frame before returning to the interrupted procedure. How the interrupt procedure handles the fields at the end of one data frame and the start of the next depends on whether the operation interrupted was a read or a write. For a write, the interrupt procedure writes trailing fields (e.g. pad bytes) of a data segment, waits for an EOS pulse, arid writes leading overhead fields (e.g. VFO, TF, and SYNC fields) before returning. For a read, the interrupt procedure resets the read gate, waits for an EOS pulse before setting the read gate, and then waits for a data sync signal before returning. Upon returning from the interrupt, the saved data count from latch 770 is reloaded into counter 760 and further decremented when the interrupted procedure is resumed.

For the track format of FIG. 3, sector pulse SEC251 starts data segment sequencer 540 handling data segment 251 when counter 530 begins decrementing the second event-count (597 or 255h). Since the second event-count is equal to the byte count for a single-segment data sector plus the byte count for an inter-sector gap, data segment sequencer 540 completes an entire data sector 251 before counter 530 decrements the second event-count to zero. As indicated by fields GSEC of the second control word, a sector pulse SEC252 is generated when the second event-count decrements to zero. Sector pulse SEC252 starts counter 530 decrementing the third event-count which is also 597 (255h) and starts data segment sequencer 540 transferring data segment 252 if data segment 252 is requested and not skipped or defective. The third and fourth control words of Table 3, being identical to the second control word of Table 3, are processed in the same manner as described above for the second event control.

When counter 530 decrements the event-count from the fourth control word to zero, counter 530 generates sector pulse SEC1, and state machine 550 loads the event-count from the fifth control word into counter 530. If sector 1 is requested and not skipped or defective, sector pulse SEC1 starts data segment sequencer 540. The fifth control word has an event-count of 137 or 89h and indicates that the even-count is synchronized with a data sync signal. At the data sync signal, counter 530 begins decrementing the fifth event-count (137) and sequencer counter 760 begins decrementing the data count for a full data field (547). The fifth event-count decrements to zero, and counter 530 generates an interrupt before the data count decrements to zero (i.e. when the data count decrements to 410). The interrupt causes data segment sequencer 540 to execute the interrupt routine before resuming decrementing of the data count for the first data segment in data frame 1.

Figure 8:
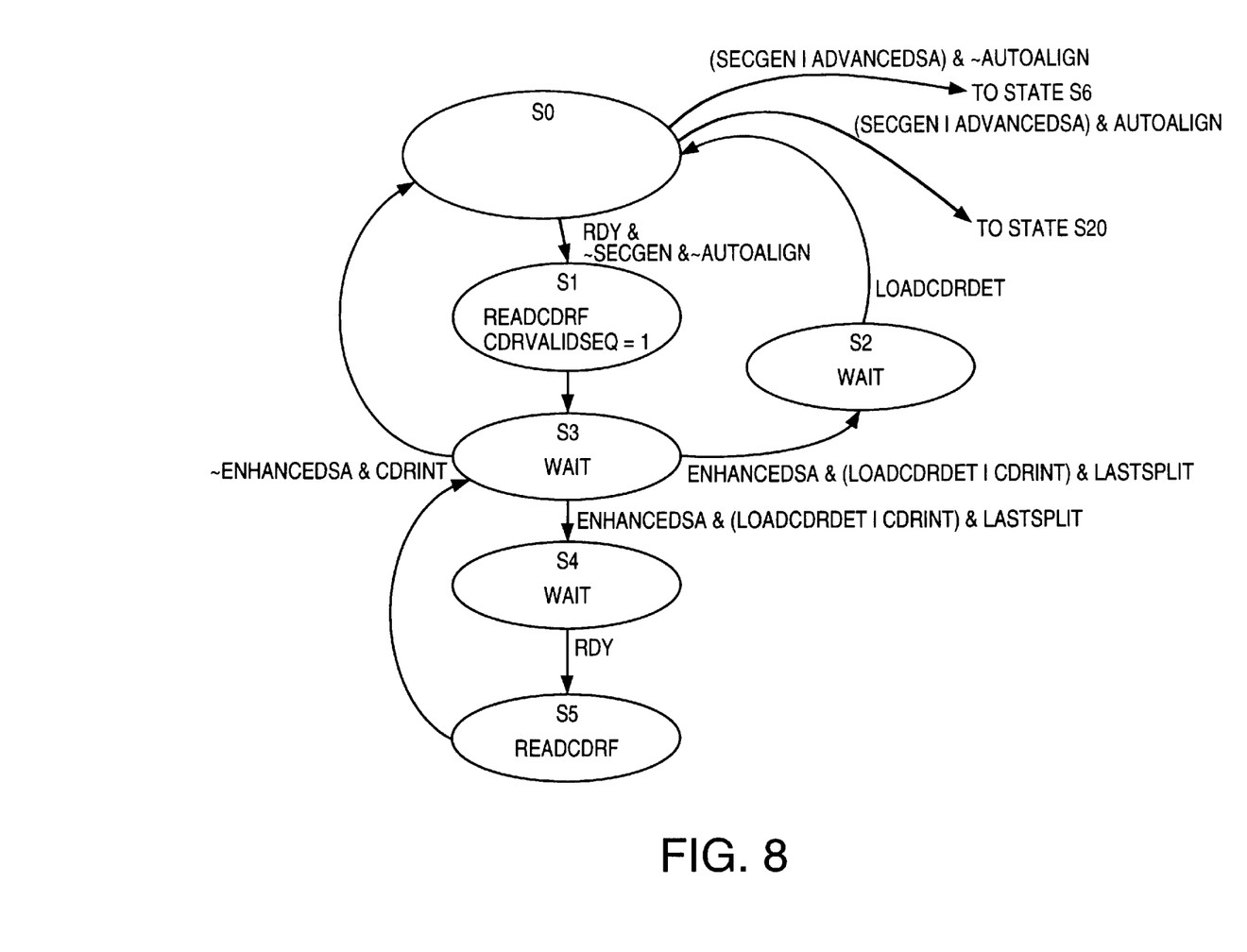
FIGS. 8, 9, and 10 provide a state diagram for a control state machine in FIG. 5.
Figure 9:
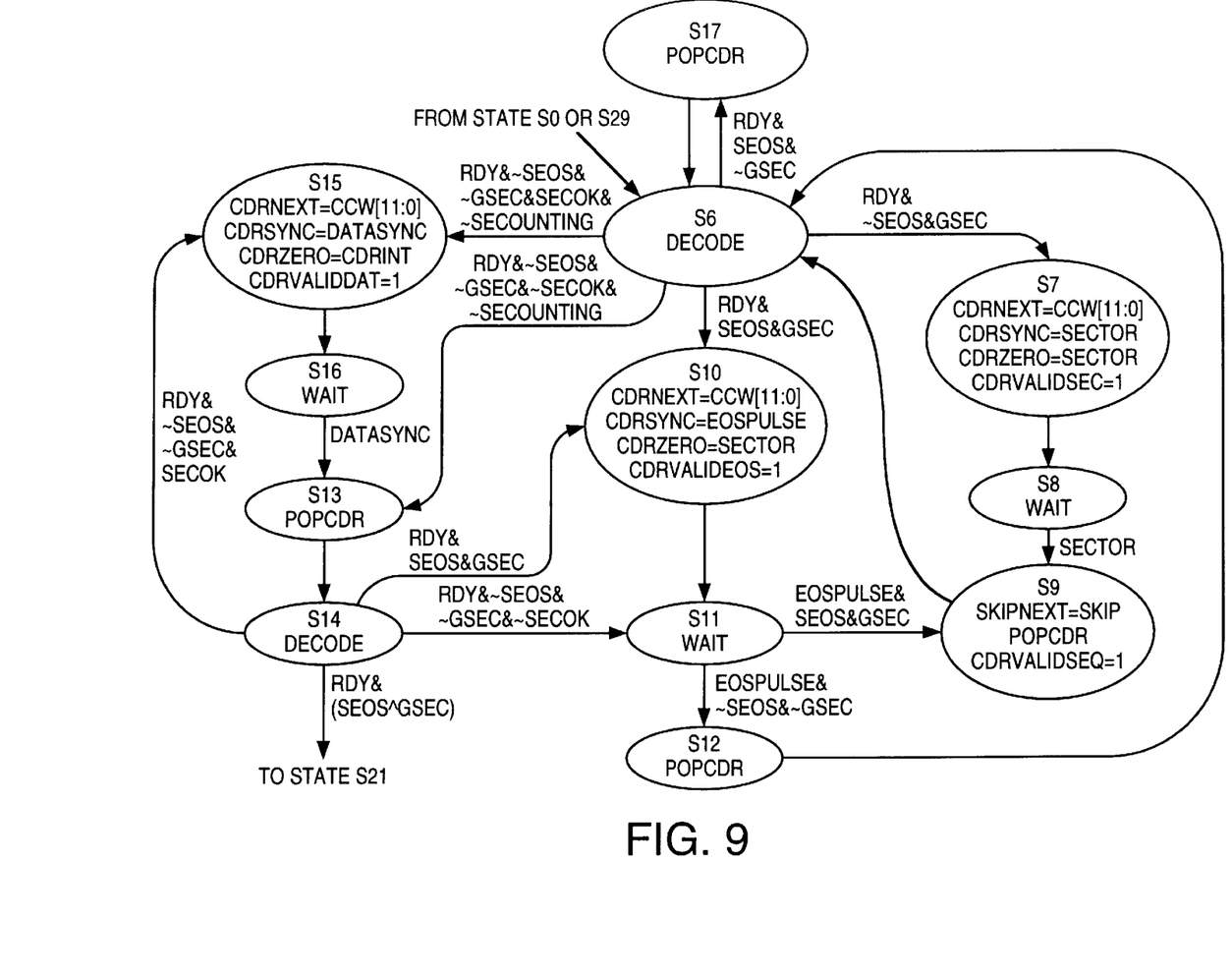
Figure 10:
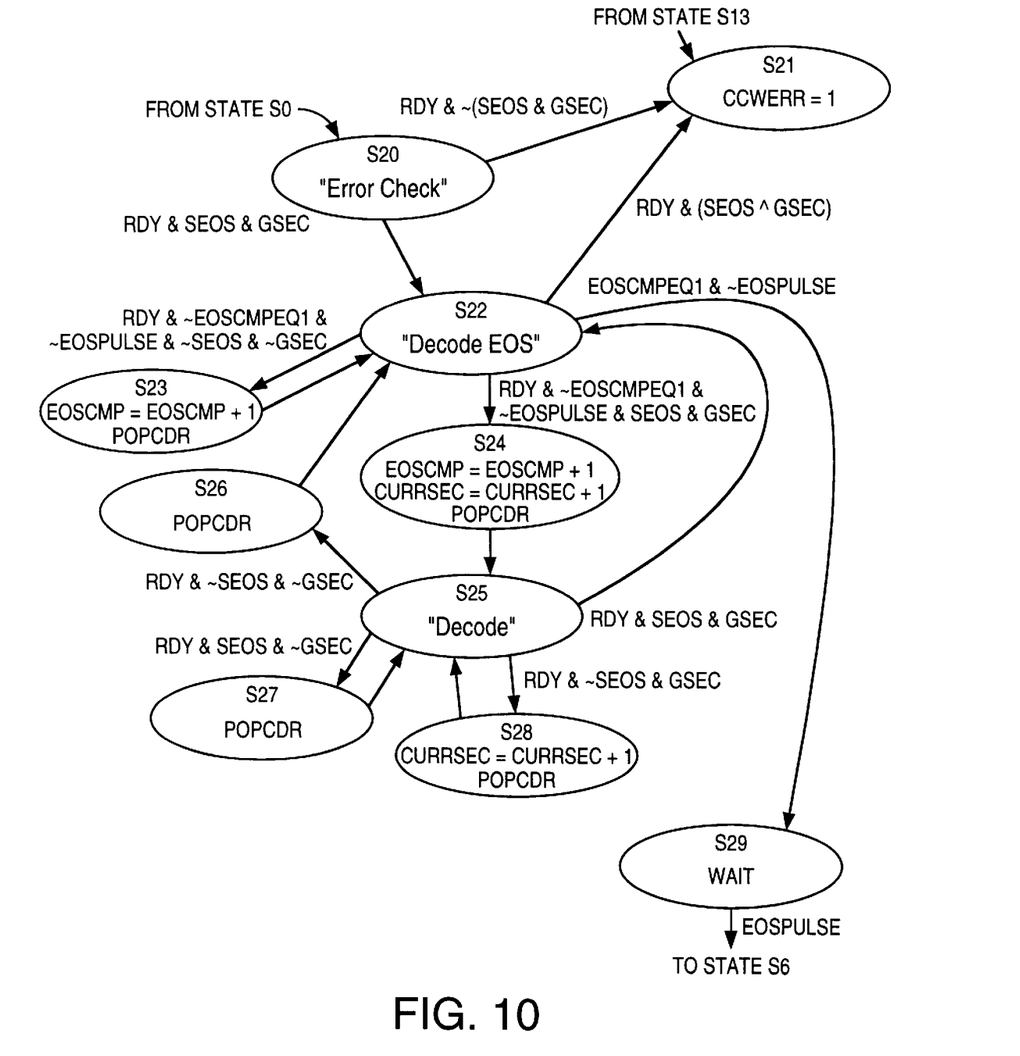

FIGS. 8, 9, and 10 illustrates the states of an exemplary embodiment of state machine 550. State machine 550 controls alternative modes of operation beginning from a state S0 shown in FIG. 8. The different modes are distinguished by whether disk sequencer 140 must align control words and/or generate sector pulses. A signal SECGEN is asserted high if disk sequencer 140 generates sector pulses. A signal AUTOALIGN is asserted high if disk sequencer 140 must align the control words. If signal SECGEN is asserted and signal AUTOALIGN is not assert, state machine 550 transitions to a state S6 in FIG. 9 for operating modes referred to herein as SGA and ADSA. If signal AUTOALIGN is assert, state machine 550 transitions to a state S20 in FIG. 10 to align the control words.

FIG. 8 illustrates the states for operating modes where an external circuit generates sector pulses (i.e. signal SECGEN is not asserted) and the control words are aligned (i.e. signal AUTOALIGN is not asserted). For a first operating mode, referred to herein as DSA/DFA mode, a signal ENHANCEDSA is not asserted which restricts state machine 550 to three states S0, S1, and S3. In state S0, state machine 550 waits for FIFO buffer 510 to assert a signal RDY indicating FIFO buffer 510 contains a valid control word. When signal RDY is asserted and signals SECGEN and AUTOALIGN are not, state machine 550 moves to state S1 and asserts as signal READCDRF which stores the value signal EVENTC in register 535 and removes and the control word from FIFO buffer 510. State machine 550 then transitions to state S3. For DSA/DFA mode, a synchronized version of an externally generated sector pulse or an EOS starts data segment sequencer 540, and counter 530 begins counting down the event-count from register 535 when signal DATASYNC or signal RETURN is asserted. Upon decrementing to zero, counter 530 asserts signal CDRINT to interrupt data segment sequencer 540. State machine 550 waits in state S3 until counter 530 asserts signal CDRINT. State machine 550 then transitions back to state S0 for the next control word.

For an enhanced mode, referred to herein as EDSA mode, state machine 550 uses field LAST of the CDR format when discarding control words. State machine 550 waits in state S0 until FIFO buffer 510 signals a valid control word is ready before transitioning to state S1 and writing field EVENTC to register 535 and removing the control word. State machine 550 then transitions to state S3 and waits until signal CDRINT or LOADCDRDET is asserted. As in DSA/DFA mode, signal CDRINT being asserted indicates an event-count from another control word is required. Signal LOADCDRDET being asserted indicates a control word associated with a current data sector is to be discarded. Control words for a data sector may be discarded if, for example, the data sector is defective or the control words are dummies that maintain a fixed number of control words per data sector in a format table. In the EDSA mode, if signal LOADCDRDET or CDRINT is asserted, state machine 550 transitions from state S3 to a state S4 if field LAST of the current control word indicates that the current control word is not the last associated with the current data sector (i.e. the control word in FIFO buffer 510 is associated with the current data sector.) State machine 550 waits in state S4 until a valid control word is ready in FIFO buffer 510 and then in a state S5, reads and removes the control word from FIFO buffer 510. From state S5, state machine 550 transfers back to state S3. If signal LOADCDRDET remains or is newly asserted and the control word removed was not the last control word for the data sector, state machine 550 immediately transitions back to state S4 and continues to loop through states S3, S4, and S5 until the last control word for the current data sector is removed. Otherwise, state machine 550 waits in state S3 until signal CDRINT is asserted indicating counter 530 has counted down to zero and requires another event-count in register 535.

In the EDSA mode, state machine 550 transitions from state S3 to state S2 if signal CDRINT or LOADCDRDET is asserted for a control word having field LAST set to indicate the control word is the last associated with a data sector. If signal LOADCDRDET was asserted, state machine 550 passes through state S2 to state S0. If signal CDRINT was asserted, state machine 550 waits in state S2 for signal LOADCDRDET which signals the finish of a data sector.

For the ECW format where disk sequencer 140 generates sector pulses, state machine 550 transitions from state S0 to state S20 to perform automatic alignment of control words or to state S6 if control words are already aligned for a data head's position relative to the track. FIG. 9 illustrates the states of state machine 550 once control words are aligned (automatically or otherwise). State machine 550 waits in state S6 until signal RDY is asserted indicating signals SKIP, SEOS, GSEC, and EVENTC are valid for the top control word in FIFO buffer 510. State machine 550 then transitions to a state S7, S10, S13, S15, or S17 according to the values of signals SEOS and GSEC.

If signals SEOS and GSEC respectively have values 1 and 0, the top control word in FIFO buffer 510 is a filler. State machine 550 transitions from state S6 to state S17 and asserts a signal POPCDR to remove the top control word from FIFO buffer 510. State machine 550 then returns to state S6.

If signals SEOS and GSEC are both 1, state machine 550 transitions from state S6 to state S10, loads an event-count into register 535, selects signal EOSPULSE for synchronization of the event-count, and sets a value CDRZERO to indicate signal SECTOR is asserted when counter 530 decrements the event-count to zero. State machine 550 sets signal SEL_SYNC to select signal EOSPULSE for synchronization of counter 530 and then transitions to a state S11. State machine 550 waits in state S11 until an EOS pulse is asserted (i.e. the event-count from register 535 transfers to counter 530) and transitions from state S11 to a state S9 if signals SEOS and GSEC are asserted (i.e. always if state machine 550 transitioned from state S10 to S11).

In state S9, state machine 550 changes signal SEL_EVENT to according to value CDRZERO, stores signal SKIP in register 525, and asserts signal POPCDR to remove the control word from FIFO buffer 510 before transitioning back to state S6. The skip value in register 525 is loaded into latch 520 when counter 530 asserts a sector pulse and is associated with the data sector following the event-count.

If signals SEOS and GSEC are respectively 0 and 1, indicating both initial and terminal events are sector pulses, state machine 550 transitions from state S6 to state S7. State machine 550 then stores an event-count indicated by signal EVENTC in register 535, selects signal SECTOR for synchronization of the event-count, sets value CDRZERO to identify a sector pulse is generated at the end of the event-count, and transitions from state S7 to a state S8. State machine 550 waits in state S8 for a sector pulse that occurs when the current event-count in counter 530 decrements to zero. At the sector pulse, the next event-count from register 535 transfers to counter 530, and state machine 550 selects signal SECTOR to be pulsed when the event-count next reaches zero. Simultaneous with the current event-count decrementing to zero, the sector pulse which is generated loads the skip value from register 525 into latch 520 and starts counter 530 decrementing the new event-count. From state S8, state machine 550 transitions to stage S9 to perform the actions described for state S9.

If signals SEOS and GSEC are both zero, indicating synchronization with signal DATASYNC and assertion of signal CDRINT, state machine 550 transitions from state S6 to state S13 or S15 after a signal SECOUNTING is deasserted to indicate that counter has stopped counting. Waiting for signal SECOUNTING avoids the chance that assertion of signal DATASYNC for a current data segment will start a new event-count (i.e. load a new value from register 535 in counter 530) before counter 530 completes the current event-count. A control word having fields SEOS and GSEC equal to zero is read in the time between counter 530 decrementing to zero and the next data sync pulse. Whether state machine 550 transitions from state S6 to S13 or S15 depends on whether the data sector associated with the top control word in FIFO buffer 510 is to be skipped. Signal SKIPSEC, which changes only for the first control word of a data sector, indicates whether the current data sector is to be skipped and applies to the control word in FIFO buffer 510. Accordingly, a signal SECOK, which is equal to ~(SKIPSEC|DEFSECEQ), is zero only if the data sector associated with the control word in FIFO buffer 510 should be skipped.

If none of signals SEOS, GSEC, and SECOK are asserted, the data sector is skipped, and an event-count for interrupt is not required because data segment sequencer 540 is not started for skipped data sectors. State machine 550 transitions from state S6 to state S13 and pops a control word from FIFO buffer 510. State machine 550 transitions from state S13 to a state S14 and waits until output signals for the next control word are ready.

The order of control words in a format table is restricted so that the next control word after the control word removed in state S13 cannot have fields SEOS and GSEC respectively equal to 1 and 0 or 0 and 1. SEOS and GSEC respectively equal to 1 and 0 would indicate a filler inserted between two control words for the same data sector and is forbidden by the table syntax that inserts fillers only as the last control words. SEOS and GSEC respectively equal to 0 and 1 would indicate synchronization to a sector pulse, but the removed control word would have generated an interrupt to data segment sequencer 540, not a sector pulse. Accordingly, if only one of signals SEOS and GSEC is 1 when output signals from FIFO buffer 510 are ready, state machine 550 transitions from state S14 to a state S21 (FIG. 10) which causes an error interrupt.

If in state S14, signals SEOS, GSEC, and SECOK remain unasserted, the next control word is for the same skipped data sector as the control word removed in state S13, and state machine 550 transitions from state S14 to state S11 and waits for an EOS pulse before transitioning to a state S12 and removing another control word from FIFO buffer 510 and then returning to state S6. If in state S14, signals SEOS and GSEC both become 1, the next event-count is synchronized with an EOS pulse and terminates with a sector pulse. State machine 550 transitions to state S and proceeds from state S10 as described above.

If signals SEOS and GSEC are unasserted but signal SECOK is asserted, counter 530 should interrupt data segment sequencer 540 at a split in a data sector. For this case, state machine 550 transitions from state S6 or S14 to state S15 to load register 535 with an event-count indicated by signal EVENTC, select signal DATASYNC for synchronization of counter 530, and set value CDRZERO to indicate signal CDRINT asserts an interrupt at the end of the count. State machine 550 then transitions to a state S16 and waits for signal DATASYNC which starts counter 530 and causes state machine 550 to set signal SEL_EVENT. State machine 550 the transitions to state S13 and proceeds from state S13 as described above.

FIG. 10 illustrates an automatic alignment process in accordance with an embodiment of the invention. The automatic alignment process would typically be performed during a seek to a new zone so that the necessary track format information is available when the data heads reach the track sought. For automatic alignment, state machine 550 sequentially removes control words from FIFO buffer 510 and updates counts EOSCMP and/or CURRSEC in counters 574 and 560 for each removed control words indicating an EOS pulse and/or a sector pulse. When count EOSCMP is equal to count EOSCTR+1, the control word aligned for the next data frame, and at the next EOS pulse, state machine 550 transistions to state S6 to identify boundaries of data segments as described in reference to FIG. 9.

At the start of the alignment process, state machine 550 transitions from state S0 of FIG. 6 to state S20 of FIG. 10 in response to assertion of a signal AUTOALIGN when signal SECGEN or ADVANCEDSA is asserted. Signal SECGEN being asserted indicates disk sequencer 140 generates sector pulses and uses control words that identify the timing of the sector pulses. Signal ADVANCEDSA indicates the control words have a syntax that identifies ends of data sectors and data frames even if sector pulses are generated externally.

The automatic alignment process of FIG. 10 requires that the top control word in FIFO buffer 510 indicate synchronizing an event-count to an EOS pulse and generating a sector pulse. Accordingly, if both signals SEOS and GSEC are not asserted when state machine 550 is in state S20, there is an error, and state machine 550 transitions from state S20 to state S21 to assert a signal CCWERR and stop disk sequencer 140. Disk sequencer 140 remains stopped, and state machine 550 remains in state S21 until being reset.

If the top control word indicates an event-count from an EOS pulse to a sector pulse, state machine 550 transitions from state S20 to a state S22. If signal EOSPULSE is asserted, the automatic alignment process is suspended in state S22 until the frame count EOSCTR is stable (i.e. when signal EOSPULSE is deasserted), and then state machine 550 checks signal EOSCMPEQ1 to determine whether count EOSCMP is equal to count EOSCTR+1. If count EOSCMP is equal to count EOSCTR+1 and signal EOSPULSE is not asserted, the control words are correctly aligned for the next data frame, and state machine 550 transitions to a state S29. If count EOSCMP is not equal to count EOSCTR+1, the control words are not aligned to the position of the data heads relative to the track being accessed. State machine 550 decodes signals SEOS and GSEC and transitions from state S22 to a state S23, S24, or S21 unless signal EOSPULSE is asserted.

In state S22, signals SEOS and GSEC should have values appropriate for the first control word of a data frame and cannot have only one of fields SEOS and GSEC set. Accordingly, if only one of signals SEOS and GSEC is asserted, an error occurred, and state machine 550 transitions from state 22 to state 21. If signals SEOS and GSEC are both unasserted for the first control word of a data frame, the control word indicates a data segment occupying an entire data frame. State machine 550 transitions from state S22 to state S23, increments count EOSCMP, and removes the control word from FIFO buffer 510. When state machine 550 returns from state S23 to S22, the top control word then in FIFO buffer 510 is again the first control word for the data frame indicated by count EOSCMP.

If both signals SEOS and GSEC are asserted when state machine 550 is in state S22, the control word indicates an event-count from the start of a data frame (i.e. an EOS pulse) to a sector pulse. State machine 550 transitions from state S22 to S24, increments count EOSCMP for the start of the new data frame, increments count CURRSEC for the start of the new data sector, and removes the top control word from FIFO buffer 510. State machine 550 then transitions to a state S25 to decode any remaining control words for the data frame. If the top control word then in FIFO buffer 510 has fields SEOS and GSEC set to indicate synchronization with an EOS pulse at the start of a data frame, the control word is the first for the next frame, and state machine 550 transitions from state S25 back to state S22. If the top control word indicates a full data sector within a data frame, signals SEOS and GSEC are respectively 0 and 1; and state machine 550 transitions from state S25 to a state S28, increments count CURRSEC, and removes the control word from FIFO buffer 510 before returning to state S25. If the next control word is a filler, signals SEOS and GSEC are respectively 1 and 0; and state machine 550 transitions from state S25 to a state S27 and removes the control word from FIFO buffer 510 before returning to state S25. If the top control word indicates an event-count to an interrupt marking the end of the data frame, signals SEOS and GSEC are both 0; and state machine 550 transitions from state S25 to a state S26 and removes the control word from FIFO buffer 510 before returning to state S22.

The control words are aligned if in state S22, count EOSCMP is equal to count EOSCTR+1 while signal EOS is not asserted. State machine 550 transitions from state S22 to state S29 and waits for an EOS pulse marking the start of the data frame aligned with the top control word in FIFO buffer 510. Data transfer can then proceed through the states described above in regard to FIG. 9.

Although the invention has been described with reference to particular embodiments, the description is only an example of the invention's application and should not be taken as a limitation. In particular, the specific syntaxes for control words and format tables can be varied in a variety of ways in keeping with the invention. Further, the circuitry and counting processes disclosed can be varied. For example, even though preceding discussion described counts that are decremented to zero to identify the timing of a terminal event, counts can end at other cut-off values such as −1 and timing can be performed by incrementing a count until the count reaches a cut-off which varies according to the event-count. Various other adaptations and combinations of features of the embodiments disclosed are within the scope of the invention as defined by the following claims.

We claim:

1. An alignment process for control words used by a disk sequencer in a disk drive using headerless data sectors, comprising:

loading control words from a format table into the disk sequencer;

writing to the disk sequencer a first data frame number that corresponds to a first of the control words loaded;

maintaining a second data frame number that identifies a current data frame that is currently aligned with a data head;

discarding from the disk sequencer all control words that correspond to the first data frame number;

incrementing the first data frame number; and repeating the discarding and incrementing until the first data frame number identifies a data frame immediately following the current data frame.

2. The process of claim 1, further comprising writing to the disk sequencer a data sector number that corresponds to the first control word loaded, wherein discarding control words comprises incrementing the data sector number once per control word having a value that indicates generation of a sector pulse.

3. The process of claim 2, wherein loading the control words comprises sequentially loading the control words from the format table into a first-in-first-out buffer in the disk sequencer and discarding comprises removing the control words in order from the first-in-first-out buffer.

4. The process of claim 1, wherein loading the control words comprises sequentially loading the control words from the format table into a first-in-first-out buffer in the disk sequencer and discarding comprises removing the control words in order from the first-in-first-out buffer.

5. The process of claim 1, wherein the disk sequencer completes the alignment process during a seek that moves the data head to a track having a format represented by the format table.

6. The process of claim 1, wherein loading the control words comprises beginning at a first control word in the format table regardless of the position of the data head, and sequentially loading the control words from the format table into the disk sequencer.

7. A disk sequencer comprising:

a buffer for storage of control words;

a first counter that provides a first count identifying a first data frame that is currently aligned with a data head;

a second counter that provides a second count identifying a second data frame that is associated with control words in the buffer;

a comparator coupled to the first and second counters, wherein the comparator compares the first and second counts to generate a signal indicating whether the second data frame immediately follows the first data frame; and a control circuit coupled to the comparator, the buffer, and the second counter, the control circuit being operable in a first mode wherein in response to the signal from the comparator indicating that the second data frame does not immediately following the first data frame, the control circuit removes from the buffer the control words associated with the second data frame and then changes the second count.

8. The disk sequencer of claim 7, wherein the first counter is coupled to increment the first count in response to end-of-servo pulses.

9. The disk sequencer of claim 8, wherein while an end-of-servo pulse is asserted the control circuit disables operation in the first mode.

10. The disk sequencer of claim 7, further comprising a data transfer circuit coupled to the buffer, wherein the control circuit is operable in a second mode for which the data transfer circuit uses control words from the buffer to identify boundaries of headerless data sectors in the first data frame.

11. The disk sequencer of claim 10, wherein the control circuit switches from the first mode to the second mode when the signal from the comparator indicates that the second data frame immediately follows the first data frame.

12. The disk sequencer of claim 7, further comprising a data port providing access for initializing the second counter so that the second count identifies the data frame associated with a first control word loaded into the disk sequencer.

13. The process of claim 3, wherein sequentially loading the control words from the format table comprises loading control words in a circular fashion in which a first of the control words from the format table is loaded immediately after loading a last one of the control words from the format table.

* * * * *